United States Patent [19]

Misek

[11] 4,333,008
[45] Jun. 1, 1982

[54] POLARIZATION CODED DOUBLET LASER DETECTION SYSTEM

[75] Inventor: Victor A. Misek, Hudson, N.H.

[73] Assignee: Sanders Associates, Inc., Nashua, N.H.

[21] Appl. No.: 569,920

[22] Filed: Apr. 21, 1975

[51] Int. Cl.³ ............................ G02F 1/01; G01J 4/00
[52] U.S. Cl. .................................. 250/225; 244/3.16; 343/7 ED; 343/100 PE; 356/364; 356/369
[58] Field of Search .................. 356/114, 117, 118, 4, 356/5, 152, 364, 369; 250/225, 199; 244/3.16; 343/100 PE, 7 ED, 7 PF

[56] References Cited

U.S. PATENT DOCUMENTS

| | | | |
|---|---|---|---|
| 3,403,394 | 9/1968 | Rouault | 343/5 R |
| 3,562,533 | 2/1971 | Doyle et al. | 250/199 |
| 3,689,924 | 9/1972 | Caruso, Jr. | 343/100 PE |
| 3,694,656 | 9/1972 | Henning | 250/225 |
| 3,721,500 | 3/1973 | Fugitt | 356/118 |

FOREIGN PATENT DOCUMENTS 1038402  8/1966  United Kingdom ................ 250/225

OTHER PUBLICATIONS

Skolnik, Radar Handbook, 12-1970, pp. 29-16.

Primary Examiner—S. C. Buczinski
Attorney, Agent, or Firm—Louis Etlinger; Richard I. Seligman

[57] ABSTRACT

A system for locating man-made specularly reflecting objects amongst non-specular surroundings such as foliage includes apparatus to initially project orthogonally polarized laser pulses towards a given area and to then detect returned laser pulses which are polarized, while rejecting randomly polarized radiation returned from non-specular objects. In one embodiment, specularly reflecting objects are detected by providing two detectors, each sensitive to light of a different polarization, and by differentially summing their outputs to reject randomly polarized incident light.

9 Claims, 4 Drawing Figures

POLARIZATION CODED DOUBLET LASER DETECTION SYSTEM

FIELD OF INVENTION

This invention relates to the detection of laser pulses returned from specularly reflecting objects, while rejecting laser radiation returned from non-specular objects and more particularly to the use of this system in laser target designation and reconnaissance.

BACKGROUND OF THE INVENTION

With respect to target designation, in the past, laser target designators have been utilized to designate a particular target by directing laser radiation at the target. This radiation is reflected by the target in all directions and is detected by a guided bomb, missile or projectile which locks onto this radiation. The radiation from the target then permits the internal guidance system for the missile, projectile or bomb to home in on the target designated by the laser.

One of the problems when utilizing such a target designator, is the problem that radiation from the laser may impinge upon objects near the target such as grass, cement, or trees, etc. Additionally, some of the radiation reflected from the target may impinge on nearby grass or cement. In either case the guided projectile may home in on an object removed from the target.

With respect to the reconnaissance application of the subject invention, the finding of a man-made object amidst foliage has been a continuing reconnaissance problem. In the past, light beams have been swept across a given area and light reflected from a shiny object is detected to indicate the presence of a man-made object. However, foliage and other naturally occurring objects also reflect light, making it difficult to pick out a man-made object in this environment.

The present invention solves the problem of detecting radiation returned from man-made objects by recognizing that most man-made objects are specular. If polarized light is projected toward an object, if the object is specularly reflecting the polarization will be preserved. However, if the object is non-specular, polarization is destroyed. The subject invention takes advantage of this phenomenon to distinguish man-made objects from naturally occurring objects. In the system described herein, the polarized light is produced by a laser which produces two pulses (a doublet) with a predetermined interpulse spacing and with the radiation making up one of the pulses polarized in one direction, while the radiation making up the other pulse is polarized in an orthogonal direction. It has now been discovered that due to a thermal birefringent effect, radiation produced by a laser rod is inherently orthogonally polarized due to thermal stress which occurs when the laser rod is excited by a flash lamp. Advantage is taken of this new-found effect by providing the laser with two laser cavities each tuned to light of a different polarization and by providing a Q-switch in each cavity. When these Q-switches are sequentially actuated two separate pulses are produced, each with a different plane of polarization. As will be seen, the two laser cavities enhance the birefringent effect such that two successive laser pulses are produced with different and distinct polarizations.

When this laser is utilized, the initial polarization is preserved by the specular reflection of the man-made object such as a tank, halftrack, armored vehicle, rifle barrel, belt buckle, etc. However, such objects as cement, grass, trees, and other foliage, etc., are non-specular such that laser radiation impinging on these objects is returned with the returned radiation being randomly polarized.

To distinguish between polarized and unpolarized radiation the subject invention includes a detector which responds only to polarized light and rejects randomly polarized radiation such that when this detector is utilized in combination with the aforementioned laser, a system is provided which distinguishes between radiation from a specular object and radiation from a non-specular object. In one embodiment, the laser is set up so that the pulses are respectively vertically and horizontally polarized. The returned radiation is detected by two detectors respectively having a vertically polarized element in front of one detector and a horizontally polarized element in front of the other detector. The outputs from these detectors are added differentially at a differential amplifier such that radiation from non-specular objects at which initial polarization is destroyed results in equal outputs from both detectors which cancel when differentially added. On the other hand, returns from a specular object which preserves the initial polarization results in an output from only one detector at a time and thus a nonzero output is available from the differential amplifier to indicate the presence of a specularly reflecting object. The output of the differential amplifier is applied to a delay circuit having a delay equal to the expected inter-pulse spacing. The signals at the input to and the output of the delay circuit are applied respectively to the input terminals of a two input terminal AND gate, with the output of the AND gate indicating the presence of two pulses having not only the requisite inter-pulse spacing but also the requisite polarization thereby permitting recovery of signals from specularly reflecting objects while rejecting randomly polarized radiation returned by non-specular objects.

It is therefore an object of this invention to provide a system for distinguishing specular from non-specular objects.

It is another object of this invention to provide an improved laser target designation system.

It is a further object of this invention to provide an improved reconnaissance system.

It is another object of this invention to provide a system in which polarized laser pulses are transmitted to a target and in which radiation returned from the target is detected by two detectors which respond to returned radiation polarized in different directions.

It is a still further object of this invention to provide a system which utilizes the thermal birefringent property of an optically pumped laser rod and the difference between specular and non-specular objects in the provision of a laser designation system which rejects background radiation returned from non-specular objects.

These and other objects of this invention will be better understood in connection with the following description in view of the appended drawings in which:

DETAILED DESCRIPTION

Figure 1:
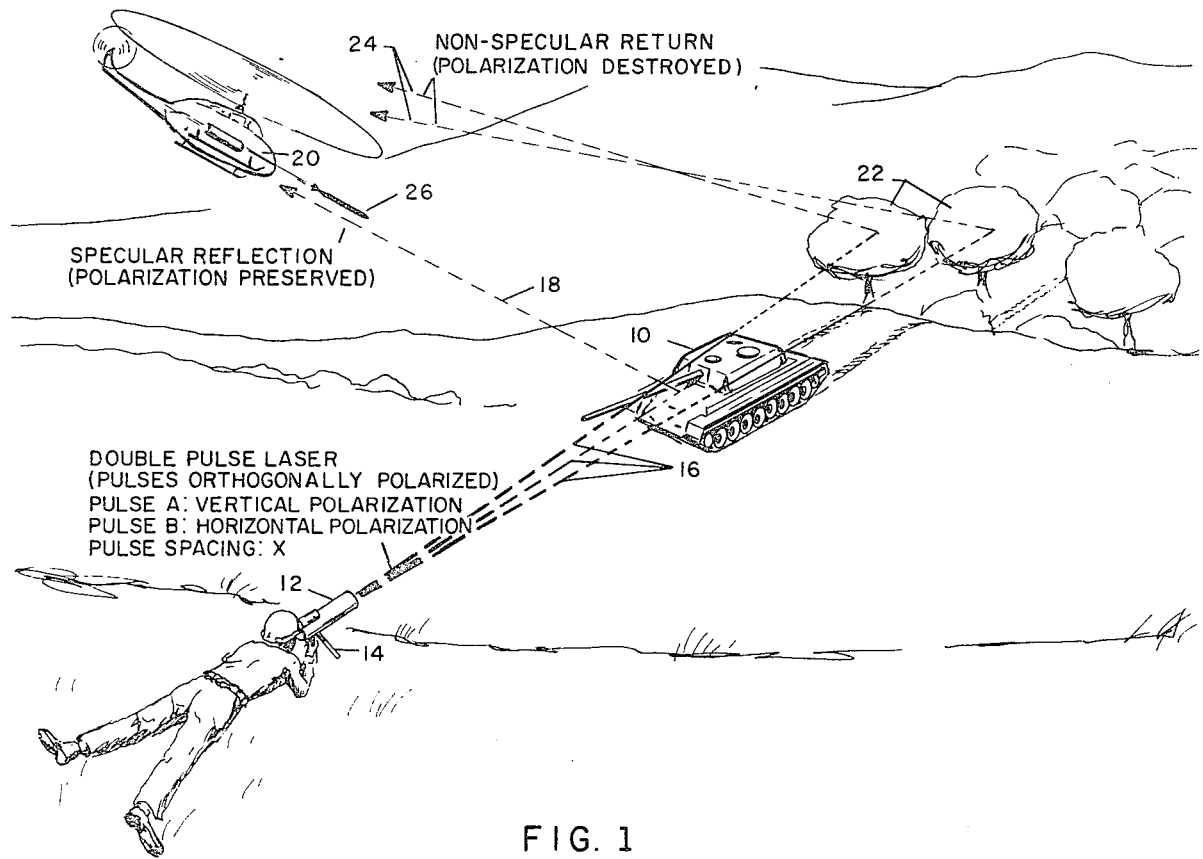
FIG. 1 is a diagrammatic illustration of a laser target designation system in accordance with the subject invention.

Referring now to FIG. 1, a typical laser target designation situation is pictured. While the subject system may be used both for laser target designation and reconnaissance the subject invention will be first described in connection with laser target designation. It should be noted, however, that the problem of singling out a man-made specularly reflective object is common to both systems.

In the situation illustrated in FIG. 1, a specularly reflective object 10 such as a tank is subjected to radiation from a laser 12 which, in one embodiment, produces two pulses, pulse A and pulse B. The laser is oriented such that pulse A is emitted with a vertical plane of polarization while pulse B is emitted with a horizontal polarization plane. The inter-pulse spacing is set so that radiation from a given laser can be recognized. The inter-pulse spacing interval is designated by the character "x". While the invention will be described in terms of orthogonally polarized pulses, it will be appreciated that any predetermined angular difference in the polarization of the two pulses may be selected and that it is not necessary for the proper operation of the subject system that orthogonally polarized pulses be generated. As will be described more fully hereinafter, the system will operate on a single polarized pulse, although the double pulse configuration permits identification of the laser which is utilized by virtue of the inter-pulse spacing. However, while laser 12 is illustrated as being mounted on a tripod 14 and man-portable, this laser may be mounted on a ground support vehicle such as a jeep or armored personnel carrier or may in fact be carried by an airborne vehicle as the tactical situation warrants.

In any event, radiation from the laser is projected towards the target as illustrated by dotted line 16. Some of this radiation will impinge on the target and be reflected in a number of different directions. As in the case with most man-made targets, the reflection will be specular, and, as mentioned hereinbefore the initial polarization is preserved. Thus, as illustrated by dotted line 18, a portion of the energy impinging on the target may be directed towards an airborne combat vehicle 20 such as a helicopter.

However, a portion of the radiation from the laser may not impinge on the target but may rather be returned by non-specular objects such as trees 22, or other foliage. Radiation returned from these non-specular objects is illustrated by dotted lines 24. This radiation may also be returned in the vicinity of vehicle 20 such that the radiation returned to vehicle 20 from both the target and non-specular objects will contain both polarized radiation and non-polarized radiation. Vehicle 20 typically carries a guided missile or projectile 26 which is fired at the target. This missile in the preferred embodiment contains apparatus for guiding the missile in accordance with radiation returned from the target. This type of system is commonplace in laser target designation system and the control system for the missile is not described herein.

It is, however, important for the guidance system of the missile to be able to distinguish between radiation returned from the target and radiation returned from objects removed from the target. In order to accomplish this, missile 26 is provided with a detection and decoding system such as that illustrated in FIG. 2. It is the purpose of this detection and decoding system to distinguish between specularly reflected radiation and radiation returned from non-specular objects. Generically, this is accomplished by projecting the aforementioned polarized pulses towards the target and by actuating the guidance system of the missile only in accordance with polarized radiation, with non-polarized radiation being rejected by the detector and decoding system.

Figure 2:
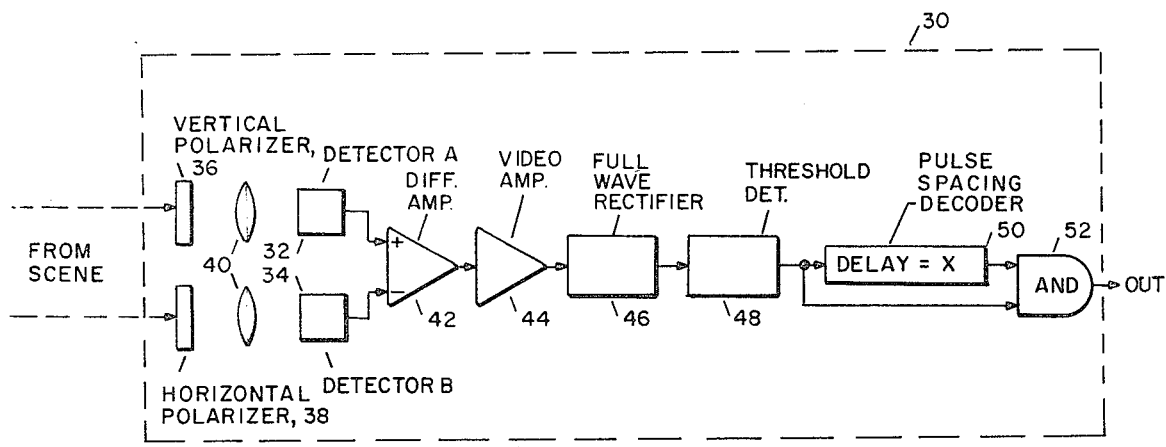
FIG. 2 is a block diagram of the detection system utilized either at the laser site or aboard a missile, guided bomb, or guided projectile for detecting and decoding returned radiation.

Referring now to FIG. 2, a detecting and decoding system illustrated within dotted box 30 is utilized to detect the presence of specularly reflected radiation. In accordance with one aspect of this invention, this system includes a detector 32, hereinafter referred to as detector A, and a detector 34, hereinafter referred to as detector B. These detectors are conventional and operate to produce an output signal responsive to the detection of incident radiation. Incoming radiation from the scene impinges on both a vertical polarizer 36 located in front of detector A, and a horizontal polarizer 38 located in front of detector B. Interposed between the polarizer and their respective detectors are suitable focusing optics 40. The outputs of detectors A and B are applied to the positive and negative inputs of a conventional differential amplifier 42, the output of which is coupled through a conventional video amplifier 44 to a conventional full wave rectifier 46. Full wave rectifier 46 rectifies the output of the video amplifier thereby converting the positive and negative signal pulses to pulses of the same polarity and provides these signals to a threshold detector 48 set to eliminate transient background effects as will be more fully described. The output of the threshold detector is coupled to the input of a delay circuit 50 which delays signals at its input by a time interval "x", which time delay equals that of the expected interpulse spacing. This circuit may either be an analog delay line or a digital device such as a shift register clocked at a readily set rate to provide the requisite delay. The output from the delay circuit 50 is applied to one input terminal of a two input terminal AND gate 52 which has the other input terminal connected to the output of the threshold detector. The output from the AND gate indicates not only that polarized radiation has been received but also that the received pulses have the appropriate inter-pulse spacing. Once the appropriate signals have been recognized, the signals from the output of the differential amplifier may be used for the guidance system of the missile.

In operation, light from the illuminated scene impinges on the polarizers and depending on its polarization plane or lack thereof is transmitted to the respective detectors. In the case of a polarized pulse, assuming that it is vertically polarized, energy from this pulse will be passed through the vertical polarizer 36 and will be detected at detector A. The horizontal polarizer will preclude the passage of radiation and there will be no output at the output of detector B. Thus, a positive going output voltage will be amplified and rectified such that a positive going pulse will appear at the output of the full wave rectifier. Assuming this pulse exceeds a predetermined threshold to be described later, it is gated to delay circuit 50 where it is delayed and is coupled to AND gate 52 a predetermined time later.

If a vertically polarized pulse is followed by a horizontally polarized pulse, this horizontally polarized pulse is transmitted through horizontal polarizer 38 to detector B. This pulse is blocked by the vertical polarizer such that the outputs of the detectors to the differential amplifier are unequal during this sequence and the differential amplifier produces, in this case, a negative going pulse which is amplified by the video amplifier 44, full wave rectified and the resulting positive going pulse is applied to the threshold detector. Assuming that this signal exceeds a predetermined threshold it is passed by the threshold detector and supplied directly to one terminal of AND gate 52. If the inter-pulse spacing is exactly equal to "x" then the output of the delay circuit will generate a positive going pulse simultaneous with the application of the positive going pulse from the threshold detector, and AND gate 52 will be actuated to produce a signal indicating the arrival of specularly reflected light.

Assuming, however, that the light returned to the detector and decoding unit 30 is randomly polarized, as would be the case from non-specular objects, then the outputs of detector A and B would be identical and the output of the differential amplifier would be zero or close to zero. Thus, the detector and decoding unit thus described discriminates against randomly polarized light while providing an indication of the receipt of properly polarized and properly spaced pulses.

It will be appreciated that it is desirable to have the vertical polarizer exactly vertical and the horizontal polarizer exactly horizontal assuming that the orientation of the pulses from the laser are respectively exactly vertical or horizontal. If, however, there is some variation between these two positions the only result for the two pulse case will be that the output of the differential amplifier will be lower than that where perfect alignment is achieved. The amplitude of the output of the differential amplifier will, of course, depend on the angular misalignment between the various planes of polarization, and a large amount of error can be tolerated with appropriate threshold setting. Thus, it can be seen that the missile or detector need not be exactly aligned in order that there be an output from the detector and decoding unit 30. This permits the subject detector and decoding unit to be mounted on a missile which is only partially stabilized. If this missile is not spin stabilized, the only time the output from the differential amplifier will be at zero will be that instant of time when the angular misalignment between the polarizers at the detector and the polarization planes of the initially projected radiation is 45°. However, since this occurs only at a very short period of time it is not a problem. With respect to the threshold detector 48, it is set to eliminate threshold noise while accomodating various misalignments between the planes of polarization of the transmitted pulses and those established by the polarizers in the detector and decoding unit.

It will be appreciated that while in the preferred embodiment the pulses produced are orthogonally polarized, this is not a necessary condition. It is possible to transmit pulses whose planes of polarization vary by more or less than 90°, with the expected vector cross-coupling. Within the decoding and detecting unit if one of the polarized members is set to the polarization plane of one of the pulses then the subject system will work with the angular difference between the polarizers at some other angle than 90°. The angle separating the polarizers determines in part the threshold of the threshold detector in that there will be vector addition caused cross-coupling between the two detectors for the pulse polarized at an angle different than the predetermined angle mentioned hereinbefore.

The system will also work when only one polarized pulse is transmitted because the system rejects randomly polarized light which results in a differential output of zero, while the single pulse is indicated by a non-zero output. In order to obtain the null result for randomly polarized light, the detectors should be identical and the polarizers should be matched and oriented in different planes.

Figure 3:
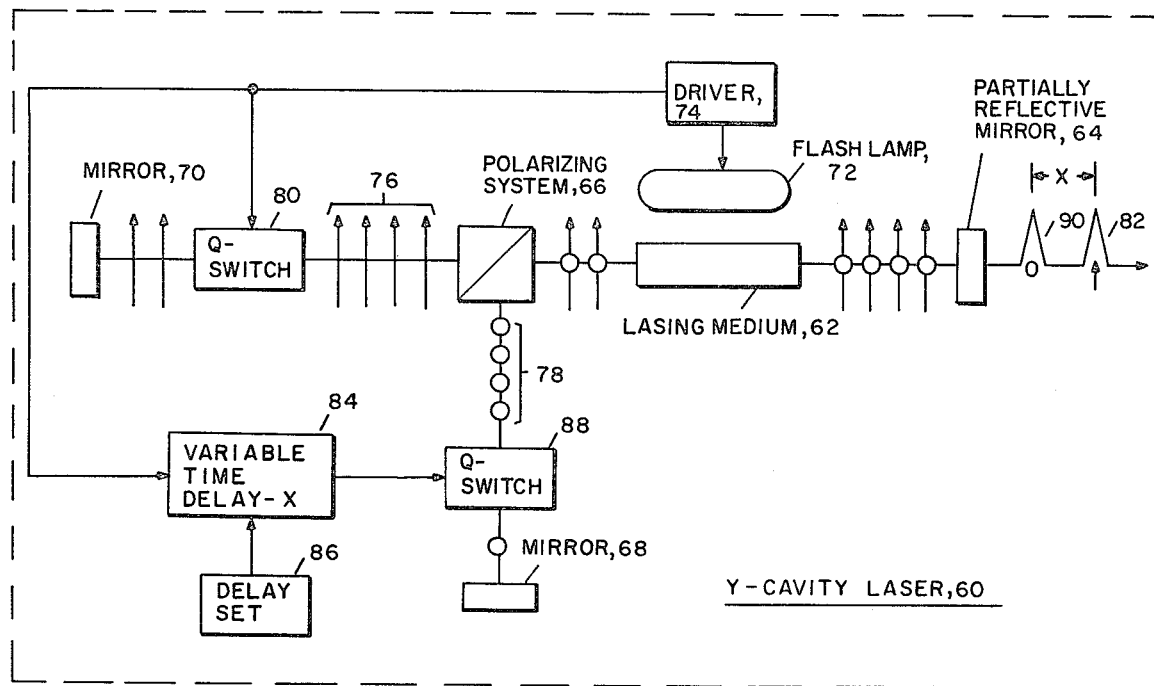
FIG. 3 is a block diagram of a double pulse laser for use in the subject system, illustrating a "Y" cavity configuration.

Referring now to FIG. 3, a laser for providing orthogonally oriented spaced pulses for use in the subject system is illustrated within dotted box 60. In this embodiment, the laser is a "Y"-cavity laser having respectively two cavities, partially overlapping, which are tuned to a predetermined transition of a lasing medium 62 which may be a laser rod of ruby, neodynium, etc.

The lasing medium, in one embodiment, is located in the partially overlapping section of the aforementioned cavities, with the partially overlapping section being the optical path between a partially reflective mirror 64 and a polarizing prism 66. The function of the polarizing prism is to redirect radiation of one polarization towards a mirror 68 while permitting the transmission of orthogonally polarized radiation to a mirror 70. The optical path between mirror 70 and mirror 64 defines one optical cavity while the optical path between mirror 68 and mirror 64 defines the other optical cavity.

The lasing medium is pumped by a conventional flash lamp 72 which is actuated by a conventional drive 74 to couple energy into the lasing medium, thereby to stimulate emission from the lasing medium. It is a finding of the subject invention that when the lasing medium is made of crystalline materials, a thermally induced birefringent effect occurs such that the stimulated emission from the lasing medium is orthogonally polarized as indicated respectively by arrows 76 and circles 78.

In timed relationship to the activation of the flash lamp, driver 74 provides a control pulse to a Q-switch 80 which is located between prism 66 and mirror 70, such that Q-switch 80 gates polarized radiation of the polarization indicated by arrows 76 to mirror 70 and then back out through the polarizing prism, lasing medium 62 and partially reflective mirror 64 to produce a first pulse 82 having the indicated polarization. The signal from driver 74 is also applied to a conventional variable time delay circuit 86. This time delay is labeled "x" and sets the inter-pulse spacing mentioned hereinbefore. After the "x" time delay, a signal is generated by variable time delay unit 84 and is applied to a Q-switch 88 a predetermined time after Q-switch 80 is turned on and off. With the activation of Q-switch 88, polarized radiation indicated by circles 78 propagates in the cavity formed by mirror 68 and mirror 64 such that radiation reflected by mirror 68 travels through Q-switch 88, is redirected by prism 66, travels through laser medium 62 and is coupled out through partially reflective mirror 64 to form a second pulse 90, with inter-pulse spacing having an interval equal to the "x" delay.

It will be appreciated that both of the cavities are tuned to one transition of the laser medium such that the cavity lengths are equal. Thus, standing waves of each polarization are achieved in the respective cavities as defined hereinabove. All of the above elements are conventional and may be obtained commercially.

Figure 4:
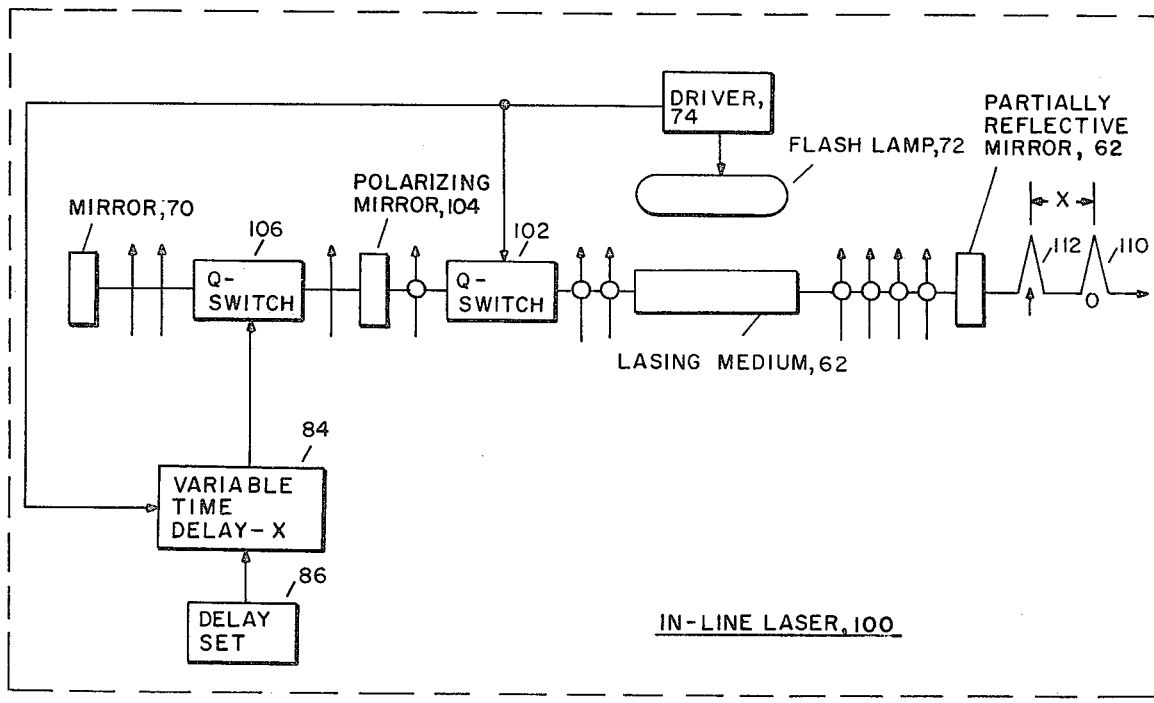
FIG. 4 is a block diagram of an inline double pulse laser system for producing orthogonally oriented pulses.

Referring now to FIG. 4, the same type double pulse production can be accomplished by an in-line laser illustrated in dotted box 100. In this figure, elements which are the same as those in FIG. 3 carry like numerical designations. It will be appreciated that the elements in this configuration are in line, with a special type of Q-switch 102 positioned between the lasing medium 62 and a polarizing mirror 104 which is oriented to reflect radiation from the lasing medium polarized in the direction indicated by the circles while transmitting and virtually unaffecting radiation polarized in the direction indicated by the arrows. In this embodiment the second Q-switch 106 which may be any of a variety of conventional switches, is located between the polarizing mirror 104 and mirror 70.

Two cavities also exist in the in-line laser configuration, with one cavity being the optical path between polarizing mirror 104 and partially reflective mirror 62 and the other cavity being the optical path between mirror 70 and partially reflective mirror 62. Since both of these cavities are tuned to the same wavelength corresponding to the same transition of the laser medium it will be appreciated that the cavity defined by mirror 70 and mirror 62 is some multiple of the wavelength of the desired transition, as is the cavity defined by the optical path between polarizing mirror 104 and partially reflective mirror 62.

In order for this system to produce double pulses each orthogonally polarized with respect to the other, Q-switch 102 is one which only affects radiation of one particular polarization. In the case illustrated, Q-switch 102 effectively gates radiation from the laser medium polarized in the direction illustrated by the circles and has no effect one radiation orthogonally polarized as illustrated by the arrows. A Q-switch which approaches these design criteria is a Pockles' cell whose orientation in the laser cavity is such that only light of one polarization is gated, or affected. Additionally, the polarizing mirror 104 is a device which reflects only radiation of one particular polarization while transmitting light of an orthogonal polarization. Both Q-switch 102 and polarizing mirror 104 are available commercially.

In operation, flash lamp 72 is actuated by driver 74 to stimulate emission in the lasing medium 62. In timed relationship with the actuation of the flash lamp, Q-switch 102 is gated on and then off such that electromagnetic energy of the polarization indicated by the circles travels back and forth between polarizing mirror 104 and partially reflective mirror 62 to produce an output pulse 110 polarized as indicated. Thereafter, Q-switch 102 is turned off and Q-switch 106 is turned on after a predetermined time delay such that electromagnetic radiation travels back and forth between mirror 70 and mirror 62. This is possible since Q-switch 102 and polarizing mirror 104 have virtually no effect on electromagnetic energy polarized in the direction indicated by the arrows. The delayed switching on of Q-switch 106 results in the production of pulse 112 with a polarization as illustrated.

What has therefore been provided is a source of orthogonally oriented pulses of coherent radiation taking advantage of the birefringent effect which is thermally induced by the pumping of the laser medium.

The subject system may be utilized in a reconnaissance operation in which it is desirable to detect man-made objects in dense foliage. In this operation a laser such as that described, may be hand-held and moved so that the pulsed laser radiation sweeps over a given area. A detector such as has been previously described, may be located physically on the laser such that the planes of polarization of the polarizers for the detectors and the planes of polarization of the emitted orthogonal pulses are automatically maintained coplanar. There may be a non-specular return from foliage, trees, grass, etc. while at a different angular orientation the laser beam may hit a specular reflecting object such as a rifle barrel, belt buckle, button, etc. When this radiation is returned to detector an alarm may be sounded. In this manner an area may be systemically swept by the pulsed laser beam and man-made objects may be easily located, where before, the objects would have been obscured by the surroundings.

Although a specific embodiment to the invention has been described in considerable detail for illustrative purposes, many modifications will occur to those skilled in the art. It is therefore desired that the protection afforded by Letters Patent be limited only by the true scope of the appended claims.

I claim:

1. A system for determining the presence of a specularly reflecting object surrounded by non-specularly reflecting objects comprising in combination:
    means for projecting a pulse of polarized electromagnetic energy to a predetermined sector of space;
    means responsive to electromagnetic energy of one polarization which has been reflected by objects at said sector of space as a result of illumination by said pulse for producing a first output signal;
    means responsive to electromagnetic energy of a polarization different from said one polarization which has been reflected by objects at said sector of space as a result of illumination by said pulse for producing a second output signal, said first and second output signals being equal for randomly polarized electromagnetic energy; and,
    means for subtracting said first output signal from said second output signal to produce a third output signal, whereby the production of said third output signal indicates the presence of energy from a specularly reflecting object.

2. The system of claim 1 wherein said projecting means is a laser and wherein said polarizations are orthogonal.

3. The system of claim 1 wherein said projecting means projects at least two pulses of electromagnetic energy, each of a different polarization, said pulses having an inter-pulse spacing of a predetermined time duration and further including means for determining the presence of pulses of said third output signal having said inter-pulse spacing.

4. The system of claim 3 wherein said determining means includes means for delaying said third output signal by an amount equal to said predetermined time duration and for indicating the simultaneous presence of said delayed signal and said third output signal.

5. The system of claim 4 wherein said projecting means is a laser and wherein the electromagnetic pulses are orthogonally polarized.

6. The system of claim 3 wherein the electromagnetic radiation responsive means are respectively polarized in the same planes as those of said projected pulses.

7. A method of designating a specularly reflecting target comprising the steps of:

projecting a pulse of polarized electromagnetic energy towards an area in which said specularly reflecting target is located;

detecting radiation of one polarization reflected by objects in said area as a result of illumination by said pulse to produce a first signal and radiation of a different polarization reflected by objects in said area as a result of illumination by said pulse to produce a second signal; and, differentially adding said first and second signals, whereby radiation reflected from non-specular objects is rejected.

8. A method of detecting a specularly reflecting object amongst non-specularly reflecting objects comprising:

sweeping an area with a beam of polarized electromagnetic energy;

detecting electromagnetic energy reflected from objects in said area illuminated by said beam having one polarization and producing a first signal responsive to the intensity of the electromagnetic energy of said one polarization;

detecting electromagnetic energy reflected from objects in said area illuminated by said beam having a different polarization and producing a second signal responsive to the intensity of the electromagnetic energy of said different polarization; and, differentially summing said first and second signals, with a non-zero result indicating a specularly reflecting object in said beam.

9. A method for determining the presence of a specularly reflecting object surrounded by non-specularly reflecting objects comprising the steps of:

projecting at least two laser pulses, each having a different polarization to a predetermined sector of space, said pulses having an inter-pulse spacing of a predetermined time interval;

detecting electromagnetic energy including that at the wavelength of said laser pulses reflected from objects in said sector of space having one polarization to produce a first signal having an amplitude related to the intensity of the electromagnetic energy of said one polarization;

detecting electromagnetic energy including that at the wavelength of said laser pulses reflected from objects in said sector of space having a different polarization to produce a second signal having an amplitude related to the intensity of the electromagnetic radiation of said different polarization, the amplitudes of said first and second signals being equal for randomly polarized reflected electromagnetic energy;

differentially adding said first and second signals to produce a third signal;

delaying said third signal by an amount equal to said predetermined time interval; and, indicating the simultaneous presence of said delayed signal and said third signal, whereby the presence of a specularly reflecting object illuminated by said laser pulses is established.

* * * * *